(12) United States Patent
Rainish et al.

(10) Patent No.: US 7,099,679 B2
(45) Date of Patent: Aug. 29, 2006

(54) METHOD OF SAVING POWER BY REDUCING ACTIVE RECEPTION TIME IN STANDBY MODE

(75) Inventors: Doron Rainish, Ramat Gan (IL); Erez Schwartz, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 10/197,212

(22) Filed: Jul. 18, 2002

(65) Prior Publication Data

US 2004/0014505 A1  Jan. 22, 2004

(51) Int. Cl.
*H04B 15/00* (2006.01)

(52) U.S. Cl. ............... 455/506; 455/504; 455/501; 455/343.1; 455/343.6; 455/574; 370/342

(58) Field of Classification Search .. 455/343.1–343.6, 455/574, 506, 501, 504; 370/342
See application file for complete search history.

(56) References Cited

U.S. PATENT DOCUMENTS

| | | | |
|---|---|---|---|
| 4,839,639 A | 6/1989 | Sato et al. | |
| 5,095,308 A | 3/1992 | Hewitt | |
| 5,152,006 A | 9/1992 | Klaus | |
| 5,241,542 A * | 8/1993 | Natarajan et al. | 370/311 |
| 5,252,963 A | 10/1993 | Snowden et al. | |
| 5,265,270 A | 11/1993 | Stengel et al. | |
| 5,361,276 A | 11/1994 | Subramanian | |
| 5,392,287 A | 2/1995 | Tiedemann et al. | |
| 5,448,774 A | 9/1995 | Yokozaki et al. | |
| 5,471,655 A | 11/1995 | Kivari | |
| 5,535,207 A | 7/1996 | Dupont | |
| 5,551,078 A | 8/1996 | Connell et al. | |
| 5,561,848 A | 10/1996 | Minami | |
| 5,627,882 A | 5/1997 | Chien et al. | |
| 5,629,940 A | 5/1997 | Gaskill | |
| 5,678,227 A | 10/1997 | Connell et al. | |
| 5,708,971 A | 1/1998 | Dent | |
| 5,737,322 A | 4/1998 | Burbidge et al. | |
| 5,740,517 A | 4/1998 | Aoshima | |
| 5,754,583 A | 5/1998 | Eberhardt et al. | |
| 5,822,689 A | 10/1998 | Hwang | |
| 5,831,544 A | 11/1998 | Park | |
| 5,907,798 A | 5/1999 | Abramsky et al. | |
| 6,026,288 A | 2/2000 | Bronner | |
| 6,088,576 A | 7/2000 | Sone | |
| 6,108,324 A | 8/2000 | Brown et al. | |
| 6,111,865 A | 8/2000 | Butler et al. | |

(Continued)

FOREIGN PATENT DOCUMENTS

EP  0 655 872  5/1995

(Continued)

OTHER PUBLICATIONS

International Search Report for NL 1023840, mailed Apr. 28, 2005.

(Continued)

*Primary Examiner*—Matthew Anderson
*Assistant Examiner*—Minh Dao
(74) *Attorney, Agent, or Firm*—Pearl Cohen Zedek Latzer, LLP

(57) ABSTRACT

In some embodiments of the present invention, a signal received by a mobile communication station in standby mode is sampled. The samples are converted to digital samples and stored in a memory. The digital samples include data from a base communication station to the mobile communication station. The stored digital samples are processed.

21 Claims, 4 Drawing Sheets

U.S. PATENT DOCUMENTS

| | | | |
|---|---|---|---|
| 6,125,137 | A | 9/2000 | Wang et al. |
| 6,134,440 | A | 10/2000 | Black |
| 6,176,611 | B1 | 1/2001 | Schushan et al. |
| 6,208,837 | B1 | 3/2001 | Koh et al. |
| 6,223,047 | B1 | 4/2001 | Ericsson |
| 6,236,674 | B1 | 5/2001 | Morelli et al. |
| 6,243,561 | B1 * | 6/2001 | Butler et al. ............... 340/7.42 |
| 6,597,929 | B1 | 7/2003 | Han et al. |
| 6,748,010 | B1 * | 6/2004 | Butler et al. ............... 375/148 |
| 6,771,616 | B1 * | 8/2004 | Abrishamkar et al. ...... 370/320 |
| 6,854,313 | B1 * | 2/2005 | Knudson et al. ............. 72/307 |
| 2002/0006805 | A1 | 1/2002 | New et al. |
| 2003/0143951 | A1 * | 7/2003 | Challa et al. ................. 455/20 |
| 2004/0202232 | A1 * | 10/2004 | Butler et al. ............... 375/148 |

FOREIGN PATENT DOCUMENTS

| | | |
|---|---|---|
| GB | 2 320 654 | 6/1998 |
| JP | 10313273 | 11/1998 |
| WO | WO 97/20446 | 6/1997 |
| WO | WO 98/02758 A1 | 1/1998 |
| WO | WO 98/44670 | 10/1998 |
| WO | WO 00/22748 A1 | 4/2000 |
| WO | WO 01/54432 | 7/2001 |
| WO | WO 02/27958 | 4/2002 |
| WO | WO 03/028232 | 4/2003 |

OTHER PUBLICATIONS

U.S. Appl. No. 09/371,276, filed Aug. 10, 1999, Rainish, Doron et al.

U.S. Appl. No. 09/780,470, filed Feb. 12, 2001, Edlis, Ofir et al.

U.S. Appl. No. 09/778,818, filed Feb. 8, 2001, Edlis, Ofir et al.

David M. DiCarlo and Charles L. Weber, "Multiple Dwell Serial Search: Performance and Application to Direct Sequence Code Acquisition", IEEE Transactionn on Comunications, vol. COM -31, pp. 650-659, No. 5, May 1983.

* cited by examiner

METHOD OF SAVING POWER BY REDUCING ACTIVE RECEPTION TIME IN STANDBY MODE

BACKGROUND OF THE INVENTION

While in standby mode, a mobile communication station may cycle through a number of operating modes. In some of these operating modes, for example, a sleep mode and various setup and power up modes, some of the blocks of the mobile communication station may be deactivated, in order to reduce the power consumption of the mobile communication station. This reduction in power consumption is particularly important for battery-operated mobile communication stations, as it may prolong the lifetime of the battery.

However, the operating modes may include a mode in which the mobile communication station may reactivate certain blocks in order to monitor a channel for messages from a base communication station. The longer the blocks are active during standby mode, the more the drain on the battery.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
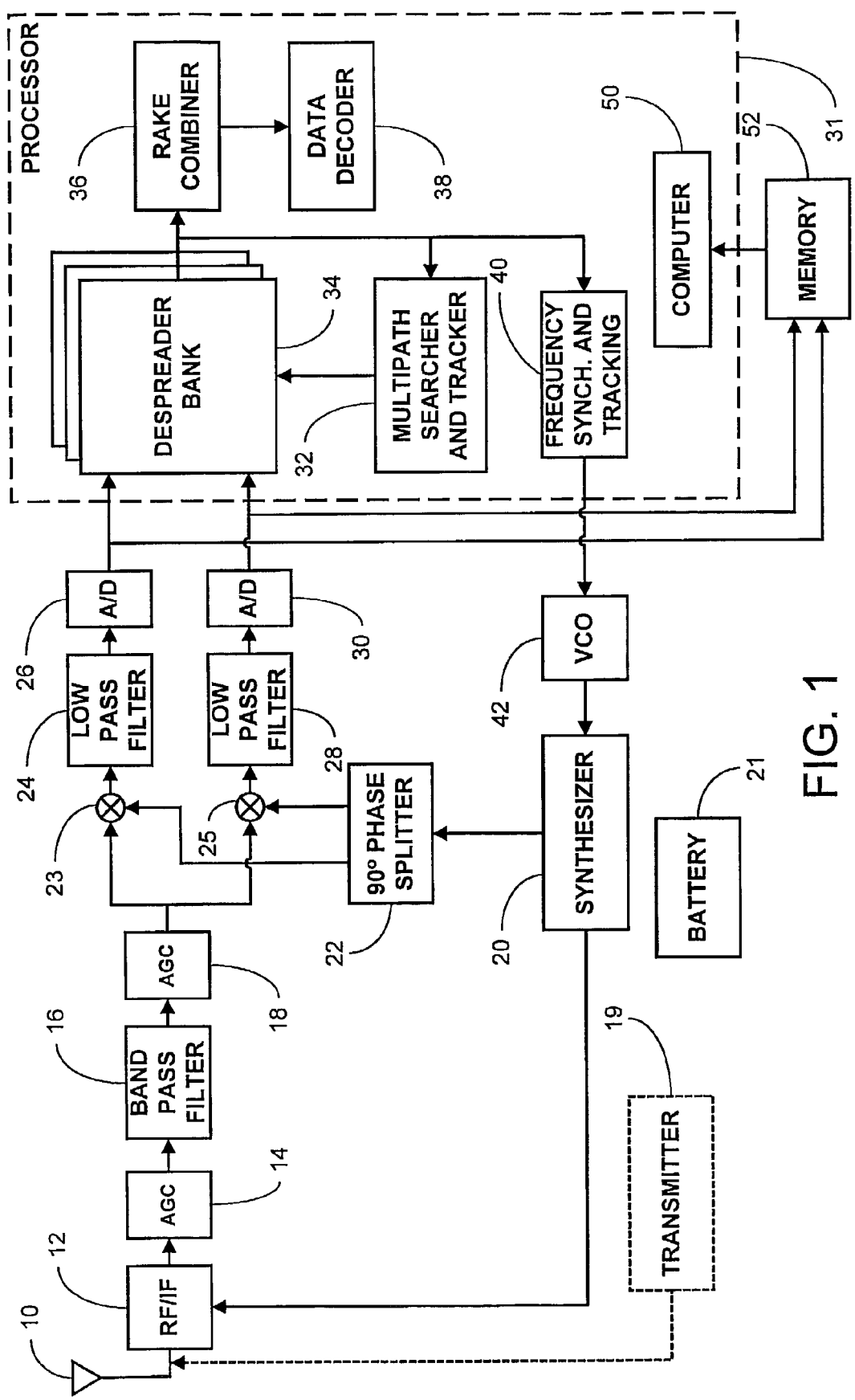
FIG. 1 is a simplified block-diagram illustration of a mobile communication station having a receiver, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuit disclosed herein may be used in many apparatuses such as in the receivers of a radio system. Radio systems intended to be included within the scope of the present invention include, by way of example only, cellular radiotelephone communication systems, two-way radio communication systems, one-way pagers, two-way pagers, personal communication systems (PCS), and the like.

Types of cellular radiotelephone communication systems intended to be within the scope of the present invention include, although are not limited to, Direct Sequence—Code Division Multiple Access (DS-CDMA) cellular radiotelephone communication systems, Wideband CDMA (WCDMA) and CDMA2000 cellular radiotelephone systems, Personal Digital Cellular (PDC) cellular radiotelephone communication systems, Global System for Mobile Communications (GSM) cellular radiotelephone systems, North American Digital Cellular (NADC) cellular radiotelephone systems, Time Division Multiple Access (TDMA) systems, Enhanced Data for GSM Evolution (EDGE) and Universal Mobile Telecommunications Systems (UMTS).

FIG. 1 is a simplified block-diagram illustration of a mobile communication station having a receiver, according to an exemplary embodiment of the present invention. A quadrature receiver is shown, although the scope of the invention is not limited in this respect. Other receiver types, for example, but not limited to, direct down conversion receivers, low intermediate frequency (IF) receivers, and those using IF sampling and other samplings, may be used. The receiver shown comprises components related to a CDMA receiver, however, this is an example only and in no way is intended to limit the scope of the invention.

Radio frequency (RF) signals from a base communication station may be received by an antenna 10, filtered, amplified and downconverted to an intermediate frequency (IF) by a down-converter 12, amplified by a first automatic gain control (AGC) circuit 14, filtered by a bandpass filter 16, and amplified by a second AGC circuit 18. Antenna 10 may be an external antenna ("stubby" (helical) or quarter wavelength monopole, for example) or an embedded antenna (planar inverted, a patch antenna, for example). It may be a dipole, a monopole antenna, a shot antenna, a dual antenna, an omni-directional antenna, a loop antenna or any other antenna type which may be used with mobile station receivers, if desired. Optionally, the mobile communication station may comprise a transmitter 19 coupled to antenna 10. Some of the components shown in FIG. 1 as belonging to the receiver may be shared by transmitter 19. The mobile communication station is powered by a battery 21, which may be, for example, a rechargeable battery or a non-rechargeable battery. For the sake of clarity, the connections between battery 21 and the other components of the mobile communication station are not shown in FIG. 1.

The amplified IF signals may be multiplied (using multipliers 23 and 25) by two IF sinusoidal signals generated by a synthesizer 20 and shifted by 90° relative to each other by a phase shifter 22, to produce an in-phase signal I and a quadrature signal Q. The in-phase signal I may be filtered by a low pass filter 24 and digitized by an analog-to-digital (A/D) converter 26. Similarly, the quadrature signal Q may be filtered by a low pass filter 28 and digitized by an analog-to-digital (A/ID) converter 30.

The mobile communication station may comprise a processor 31 to process the digital output of A/D converters 26 and 30. A searcher 32 may perform the correlations needed to determine various multipath delays. Multipath searcher 32 may also track found multipaths. The digitized signals may be correlated, at the delays determined by searcher 32, by the correctors of a despreader bank 34, whose outputs may be transferred to searcher 32. The outputs of despreader bank 34 may be combined in a rake combiner 36 and fed to a data detector 38 for detection of data in the signals.

A frequency synchronization and tracking unit 40 may process the output of despreader bank 34 to determine the control voltage to be fed to a voltage control oscillator (VCO) 42 which supplies a corrected frequency to synthesizer 20. Synthesizer 20 may generate the frequencies required to phase splitter 22 and to down converter 12 so the required frequency will be received. Alternatively, although it is not shown in FIG. 1, the mobile communication station may comprise a fractionally N synthesizer that receives digital commands instead of analog input from VCO 42.

Processor 31 may also comprise a computer 50, which may be coupled to a memory 52. Computer 50 may be a digital signal processor (DSP) or a microcontroller, or both.

Although it is not explicitly shown in FIG. 1 for reasons of clarity, computer 50 may be able to control searcher 32, despreader bank 34, rake combiner 36, data decoder 38 and unit 40 and may be able to determine whether these blocks operate on the output of A/D converters 26 and 30 or on stored digital samples.

Moreover, although it is not explicitly shown in FIG. 1 for reasons of clarity, computer 50 may be coupled to the RF components in order to be able to activate and deactivate them. Although the present invention is not limited in this respect, RF components coupled to computer 50 may include down-converter 12, AGC 14, bandpass filter 16, AGC circuit 18, phase shifter 22 and multipliers 23 and 25, synthesizer 20, and VCO 42. Low pass filters 24 and 28 are baseband components, but may, for example, sit on the same chip as the RF components.

Figure 2:
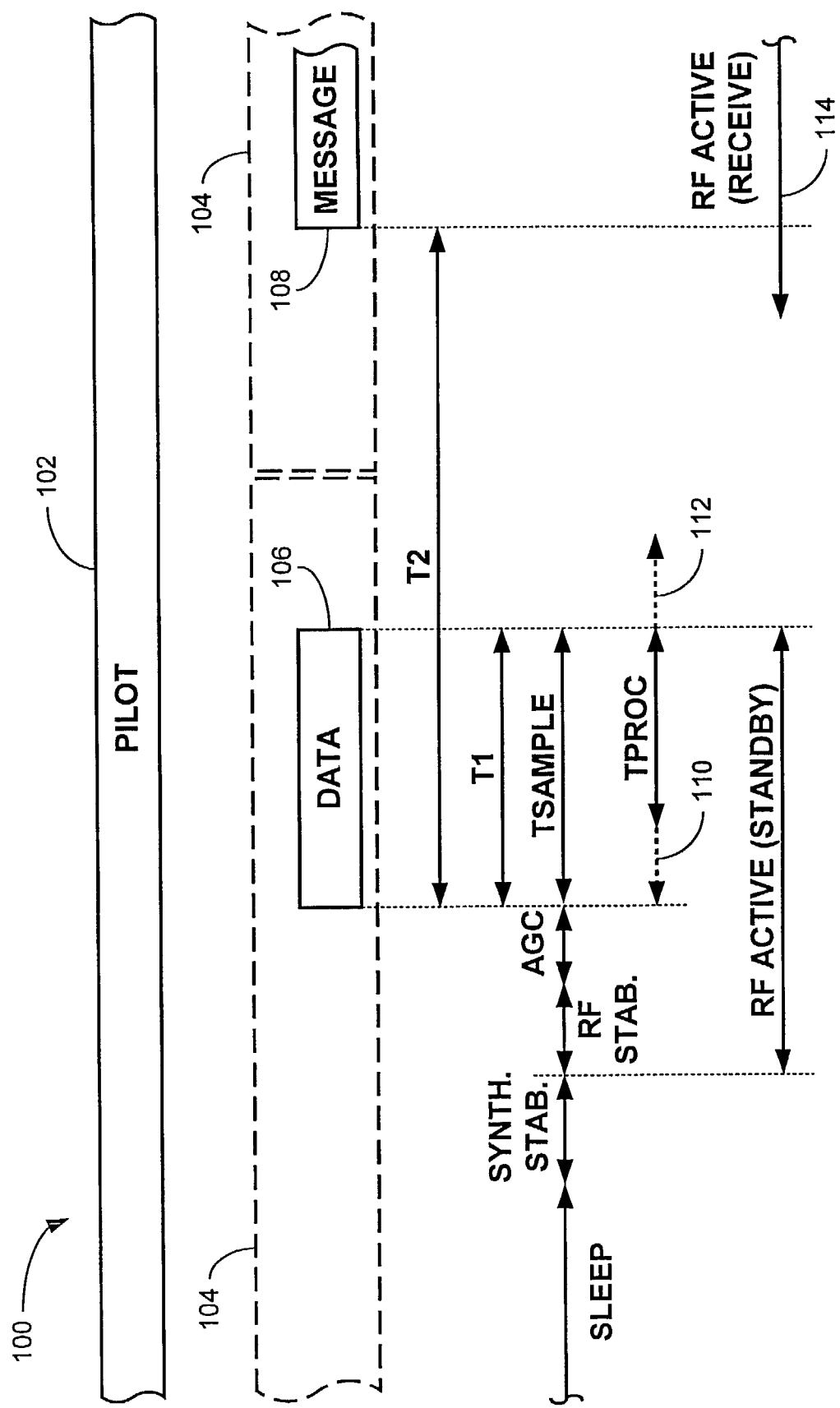
FIGS. 2, 3 and 4 are illustrations of a signal and of time indications helpful in understanding some embodiments of the present invention.
Figure 3:
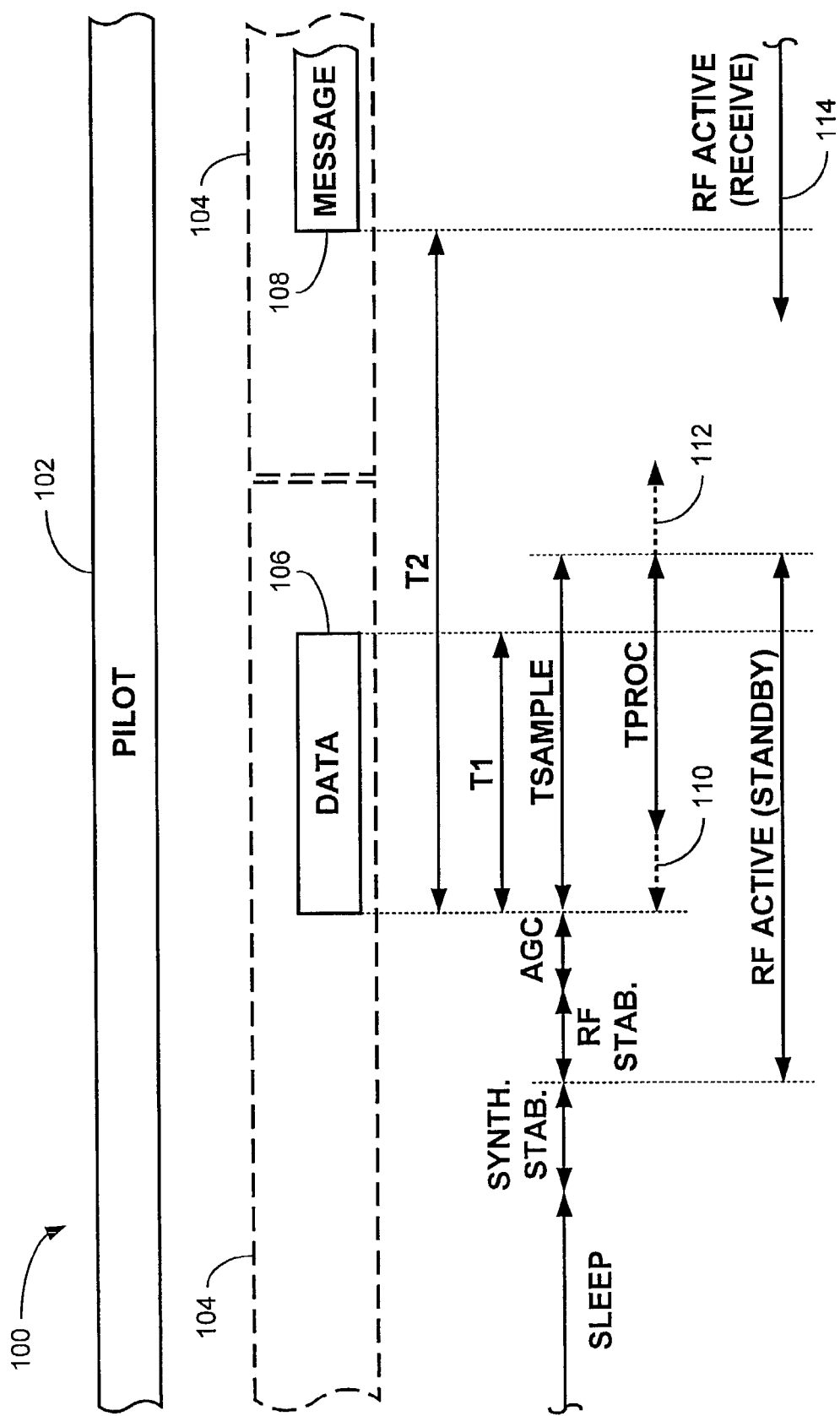
Figure 4:
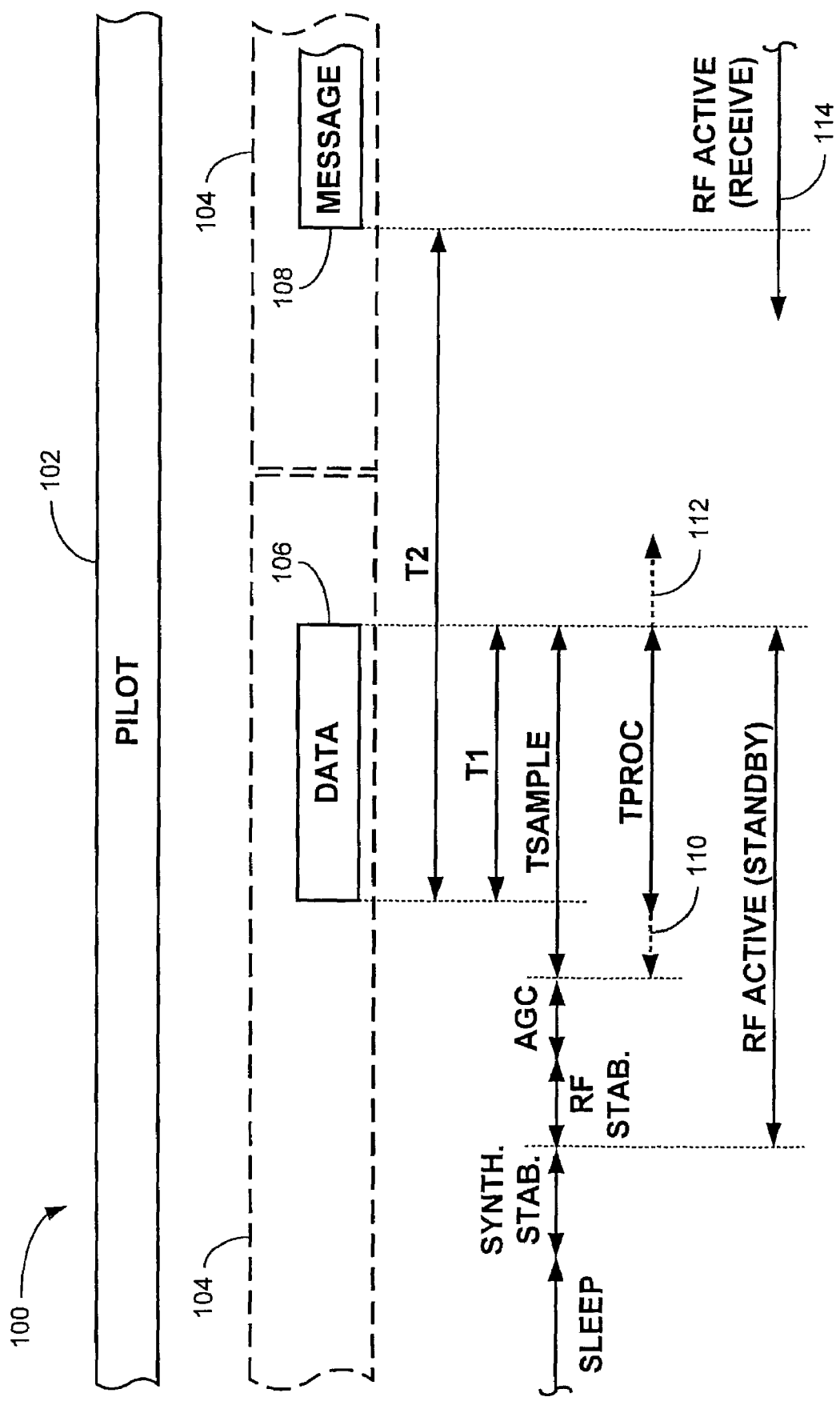

FIGS. 2, 3, and 4 are illustrations of a signal and of time indications helpful in understanding some embodiments of the present invention. Reference numerals may be repeated among the figures to indicate corresponding or analogous elements. A signal, generally referenced 100, may be continuously transmitted from a base communication station. The signal may be a code division multiple access (CDMA) signal, which may comprise a continuous pilot signal 102 and frames 104 of data intended for the various mobile communication stations in the base communication station's cell.

In wideband CDMA (WCDMA), each mobile communication station may know in which part of the frame the data intended for it is transmitted. The data intended for a particular mobile communication station, referenced 106, may be an indication to that mobile communication station whether a message 108 is about to be sent to it by the base communication station (paging indicator). The duration of data 106, referenced T1, may be on the order of 67 to 533 microseconds. In WCDMA, the mobile communication station may know in advance the time interval between the beginning of data 106 and the beginning of its message 108. This time interval is referenced T2 and may be on the order of 2.5 to 20 milliseconds.

Certain sections of the mobile communication station in standby mode may be activated prior to the time when data 106 is received. For example, a block including synthesizer 20 may be activated until it stabilizes. Once the synthesizer block has stabilized, the receive path of the radio frequency (RF) section may be activated, and once the receive path of the RF section has stabilized, approximately 1 millisecond may pass until the automatic gain control (AGC) circuits 14 and 18 have settled.

According to some embodiments of the present invention, the mobile communication station may sample a signal received via antenna 10, may convert the samples to digital samples using its analog-to-digital (A/D) converters 26 and 30, and may store the digital samples in its memory 52. The time during which the mobile communication station samples signal 100 and stores the digital samples, referenced TSAMPLE, includes, at a minimum, time interval T1 in which data 106 is sent, so that the stored digital samples include all of data 106.

FIG. 2 illustrates embodiments of the present invention in which sampling and storing is generally coincident with the reception of data 106. FIG. 3 illustrates embodiments of the present invention in which sampling and storing begins at the start of reception of data 106 and continues after the end of reception of data 106. FIG. 4 illustrates embodiments of the present invention in which sampling and storing begins before the start of reception of data 106. These embodiments will be described in greater detail hereinbelow.

It will be appreciated by persons of ordinary skill in the art that many other embodiments of the present invention are possible, including, but not limited to, embodiments in which sampling and storing begins before the start of reception of data 106 (as in FIG. 4) and continues after the end of reception of data 106 (as in FIG. 3). Similarly, instead of immediately continuing sampling and storing at the end of reception of data 106, as in FIG. 3, the mobile communication station may stop sampling and storing at any time after the end of reception of data 106 and then resume sampling and storing sometime later.

Processor 31 may perform various tasks offline on the stored digital samples. The time during which processor 31 processes the stored digital samples, referenced TPROC, may begin when the sampling and storing begins, as indicated by dashed arrow 110, or may begin later. Processing may end when the sampling and storing ends, or may continue after the sampling and storing ends, as indicated by dashed arrow 112.

Although the scope of the present invention is not limited in this respect, some or all of the tasks may be performed by computer 50, or some or all of the tasks may be performed by blocks 32, 34, 36, 38 and 40, controlled by computer 50.

Some of the tasks, such as multipath searching and tracking, frequency synchronization and tracking, time synchronization and tracking, and rake combining, are "preparatory" tasks that must be completed before the task of decoding data 106 can take place. Other tasks, such as searching for and monitoring nearby base communication stations, may be performed on the stored digital samples without regard for the timing of the preparatory tasks and the decoding of data 106.

Since the tasks are performed offline on the stored digital samples, the processing speed is a function of processor 31 (which is shown in FIG. 1 as a combination of hardware and software, although the present invention is not limited in this respect, since processor 31 may substantially equally be implemented in hardware or software) and not of the incoming data rate. Some of the tasks, for example tracking of channel variations and frequency tracking, may be performed in parallel on the stored digital samples.

Reference is now made to FIG. 2. If the stored digital samples obtained by the end of time interval T1 suffice for all the required preparatory tasks, then part or all of the receive path of the RF section may be deactivated at the end of time interval T1, and sampling and storing may cease. Processing of the stored digital samples may not necessarily stop at the end of time interval T1. Rather, as indicated by dashed arrow 112, processor 31 may continue to process the stored digital samples while part or all of the receive path of the RF section is deactivated. In some embodiments, for example, the processing before the end of time interval T1 may involve multipath searching, and the decision to deactivate part or all of the receive path of the RF section at the end of time interval T1 may be based on quality measures of the found fingers, examples of which are given hereinbelow. After time interval T1, processor 31 may perform other preparatory tasks, such as multipath tracking, frequency synchronization and tracking, time synchronization and tracking, and rake combining. In other embodiments, all preparatory tasks and data decoding may be successfully completed by the end of time interval T1. In still other embodiments, processing of non-preparatory tasks, such as searching for and monitoring nearby base communication stations, may occur after time interval T1.

Once the required preparatory tasks have been successfully completed, processor 31 may reliably decode data 106 and may be able to reliably decide whether the base communication station is sending it a message in the next frame. If there is no message forthcoming, then computer 50 may reactivate the receive path of the RF section in some subsequent frame prior to the time when the mobile communication station's data is to be received (not shown). If there is a message forthcoming, then computer 50 may reactivate the receive path of the RF section in the next frame in time to enter receive mode and successfully receive the message, as indicated by arrow 114. In either case, if TSAMPLE is generally coincident with time interval T1, then the receive path of the RF section has been activated in standby mode for the minimal time of the data reception and a little extra time prior to that, during which, for example, the settling of the RF section and the AGC occurred.

Reference is now made to FIG. 3. Unlike the embodiments shown in FIG. 2, it may happen that the stored digital samples obtained by the end of time interval T1 do not suffice for all the required preparatory tasks, i.e. they are insufficient for data 106 to be reliably decoded. This may be due to poor channel conditions, or due to the complexity and/or quantity of the required tasks, or due to other factors, or due to any combination of these factors. Various quality measures that indicate whether the stored digital samples suffice for all the required preparatory tasks are described hereinbelow. In such cases, the mobile communication station may decide to continue sampling and storing after time interval T1, as indicated by TSAMPLE ending later than the end of time interval T1. (The additional digital samples may be stored in memory 52 alongside the digital samples sampled during time interval T1, which contain data 106.) The receive path of the RF section will remain active while the mobile communication station samples and stores.

Alternatively, as mentioned hereinabove, computer 50 may deactivate part or all of the receive path of the RF section at the end of time interval T1, and stop sampling and storing, and may at a later time reactivate the receive path of the RF section in order to resume sampling and storing.

Although this is not explicitly shown in FIG. 3, the method of evaluating the currently stored digital samples and then, if necessary, either continuing or resuming sampling and storing, may be repeated until reliable decoding of data 106 is possible or the memory storing the samples is full. Sampling, storing and processing may continue even after message 108 has started since message 108 may be decoded from the stored data if needed. If the memory storing the samples is full, computer 50 may decide to deactivate part or all of the receive path of the RF section and to reactivate it in some subsequent frame prior to the time when the mobile communication station's data is to be sent (not shown). Alternatively, as indicated by arrow 114, the mobile communication station may decide to deactivate part or all of the receive path of the RF section and reactivate it in the next frame in time to enter receive mode and attempt to receive the message, which it is not certain is being sent.

Reference is now made to FIG. 4. The timing of data 106 within frame 104 may be such that not enough time is available to sample and store a sufficient amount of digital samples before message 108 ends. This is especially time when channel conditions are bad and/or when many complex tasks are to be performed on the stored digital samples before data 106 may be reliably decoded. Therefore, as mentioned hereinabove, in order to reduce the likelihood of message 108 ending before data 106 has been reliably decoded, the mobile communication station may begin sampling and storing prior to the start of reception of data 106. Some of the factors that may determine when the mobile communication station begins sampling and storing include channel conditions, the complexity and quantity of the preparatory tasks to be performed on the stored digital samples, and the time interval from the start of reception of data 106 until the end of message 108.

Certain tasks, for example searching for and monitoring nearby base communication stations, are independent of data 106 and the timing of data 106 relative to message 108. Even if data 106 has already been reliably decoded, or reception of message 108 has already started, or some other criteria which would lead computer 50 to deactivate part or all of the receive path of the RF section have been satisfied, in some embodiments of the present invention, computer 50 may decide to keep the receive path of the RF section active and to continue sampling and storing. The newly stored digital samples may be processed along with the previously stored digital samples in order to perform these tasks. Alternatively, the processing may be performed on the newly stored digital samples and not on the previously stored digital samples. Similarly, even if part or all of the receive path of the RF section has been deactivated, in some embodiments, computer 50 may decide to reactivate the receive path of the RF section and to resume sampling and storing.

As mentioned hereinabove, various quality measures may be applied that indicate whether the stored digital samples suffice for all the required tasks. For example, the power estimation Er of the received signal may be used as a quality measure. It is defined as follows:

$$Er = \sum_{i=1}^{NP} Ep(i),$$

where NP is the number of multipaths, Ep(i), the estimated power of multipath i, is defined as $Ep(i)=|R(i)|^2$, and $R(i)$ is defined as $$R(i) = \frac{1}{\text{Dwell}} \sum_{j=1}^{\text{Dwell}} \frac{1}{|S_j|^2} r_j(i) \cdot S_j^*.$$

$r_j(i)$ is the de-spreader output of the $j^{th}$ symbol of the received signal of multipath i and $S_j$ is the transmitted $j^{th}$ symbol. In WCDMA and IS-95, the receiver knows the pilot symbols. In other cellular systems, the receiver may estimate the pilot symbols. "Dwell" is the estimation period.

Alternatively, the estimated signal-to-noise-and-interference ratio, SNIR, may be used as a quality measure. It is defined as the sum over all found multipaths of the estimated signal-to-noise-and-interference ratio of each multipath, SNIR(i), as follows:

$$SNIR = \sum_{i=1}^{NP} SNIR(i).$$

SNIR(i) is defined as follows:

$$SNIR(i) = \frac{Ep(i)}{It(i)},$$

where It(i) is the estimated averaged sum of noise and interference at multipath i.

It(i) may be estimated as follows:

$$It(i) = \frac{1}{\text{Dwell}} \sum_{j=1}^{Dwell} |r_j(i) - R(i)S_j|^2.$$

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   storing digital samples of a signal received by a mobile communication station in standby mode, said digital samples including data from a base communication station to said mobile communication station, said data indicating whether a message to said mobile communication station is forthcoming;
   deactivating at least part of a receive path of said mobile communication station;
   processing said stored samples; and
   deciding whether to enable said mobile communication station to receive said message,
   wherein said processing includes:
      searching for multipaths within said signal; and
      estimating whether said stored samples are sufficient to enable reliable decoding of said data,
      wherein said estimating comprises:
         estimating a plurality of signal power values corresponding to a plurality of found multipaths, respectively;
         estimating a plurality of noise-and-interference power values corresponding to said plurality of found multipaths, respectively;
         determining a ratio value corresponding to a plurality of ratios between said plurality of signal power values and said plurality of noise-and-interference power values, respectively; and
         comparing said ratio value to a predetermined value.

2. The method of claim 1, wherein processing said stored samples comprises rake combining two or more of said found multipaths.

3. The method of claim 1, wherein processing said stored samples comprises tracking the timing of one or more of said found multipaths.

4. The method of claim 1, wherein processing said stored samples comprises searching for and tracking a carrier frequency of said signal.

5. The method of claim 1, wherein processing said stored samples comprises tracking channel variations occurring while storing said digital samples.

6. The method of claim 1, wherein processing said stored samples comprises monitoring nearby base stations.

7. The method of claim 6, further comprising:
   storing additional digital samples of said signal; and
   monitoring nearby base stations using at least said additional samples.

8. The method of claim 1, wherein processing said stored samples comprises searching for new base stations.

9. The method of claim 8, further comprising:
   storing additional digital samples of said signal; and
   searching for new base stations using at least said additional samples.

10. The method of claim 1, wherein processing said stored samples comprises decoding said data.

11. The method of claim 1, wherein deactivating at least part of said receive path comprises deactivating at least part of said receive path if said stored samples are sufficient.

12. The method of claim 11, wherein processing said stored samples comprises processing said stored samples after deactivating at least a part of said receive path.

13. The method of claim 1, further comprising:
   if said stored digital samples are insufficient, storing additional digital samples of said signal.

14. The method of claim 1, further comprising:
   if said stored digital samples are insufficient, reactivating said receive path and storing additional digital samples of said signal.

15. The method of claim 14, wherein processing said stored samples comprises processing said stored samples after deactivating at least a part of said receive path.

16. A mobile communication station comprising:
   a dipole antenna; and
   a processor to process stored digital samples of a signal received via said antenna by said mobile communication station in standby mode, said digital samples including data from a base communication station to said mobile communication station, said data indicating whether a message to said mobile communication station is forthcoming,
   wherein said processor is able to decide whether said mobile communication station is to receive said message and is able to deactivate at least part of a receive path of said mobile communication stations,
   and wherein said processor is able to search for multipaths within said signal; estimate a plurality of signal power values corresponding to a plurality of found multipaths, respectively; estimate a plurality of noise-and-interference power values corresponding to said plurality of found multipaths, respectively; determine a ratio value corresponding to a plurality of ratios between said plurality of signal power values and said plurality of noise-and-interference power values, respectively; and estimate whether said stored samples are sufficient to enable reliable decoding of said data by comparing said ratio value to a predetermined value.

17. The mobile communication station of claim 16, wherein said processor is able to monitor nearby base stations.

18. A mobile communication station comprising:
a memory containing instructions, which when executed by a processor, causes said processor to:
store digital samples of a signal received by said mobile communication station in standby mode, said digital samples including data from a base communication station to said mobile communication station, said data indicating whether a message to said mobile communication station is forthcoming;
process said stored samples; and
decide whether to enable said mobile communication station to receive said messages,
wherein the instructions causing said processor to process said stored samples cause said processor to:
search for multipaths within said signal;
estimate a plurality of signal power values corresponding to a plurality of found multipaths, respectively;
estimate a plurality of noise-and-interference power values corresponding to said plurality of found multipaths, respectively;
determine a ratio value corresponding to a plurality of ratios between said plurality of signal power values and said plurality of noise-and-interference power values, respectively;
and estimate whether said stored samples are sufficient to enable reliable decoding of said data by comparing said ratio value to a predetermined value.

19. The mobile communication station of claim 18, wherein said instructions, when executed by said processor, further cause said processor to monitor nearby base station.

20. An apparatus comprising:
a processor to process stored digital samples of a signal received by a mobile communication station in standby mode, said digital samples including data from a base communication station to said mobile communication station, said data indicating whether a message to said mobile communication station is forthcoming,
wherein said processor is able to decide whether said mobile communication station is to receive said message and is able to deactivate at least part of a receive path of said mobile communication station
and wherein said processor is able to search for multipaths within said signal; estimate a plurality of signal power values corresponding to a plurality of found multipaths, respectively; estimate a plurality of noise-and-interference power values corresponding to said plurality of found multipaths, respectively; determine a ratio value corresponding to a plurality of ratios between said plurality of signal power values and said plurality of noise-and-interference power values, respectively; and estimate whether said stored samples are sufficient to enable reliable decoding of said data by comparing said ratio value to a predetermined value.

21. The apparatus of claim 20, wherein said processor is able to track channel variations occurring while said digital samples are being stored.

* * * * *